US009808111B2

(12) United States Patent
Mariller

(10) Patent No.: US 9,808,111 B2
(45) Date of Patent: *Nov. 7, 2017

(54) DEVICE FOR PREPARING A DRINK EXTRACTED FROM A CAPSULE

(71) Applicant: ETHICAL COFFEE COMPANY SA, Fribourg (CH)

(72) Inventor: Alain Mariller, Le Mont-Pelerin (CH)

(73) Assignee: ETHICAL COFFEE COMPANY SA, Fribourg (CH)

(*) Notice: Subject to any disclaimer, the term of this patent is extended or adjusted under 35 U.S.C. 154(b) by 135 days.

This patent is subject to a terminal disclaimer.

(21) Appl. No.: 14/671,984

(22) Filed: Mar. 27, 2015

(65) Prior Publication Data
US 2015/0201793 A1 Jul. 23, 2015

Related U.S. Application Data

(63) Continuation of application No. 13/386,482, filed as application No. PCT/IB2010/053256 on Jul. 16, 2010, now Pat. No. 9,113,746.

(51) Int. Cl.
A47J 31/00 (2006.01)
B65D 85/804 (2006.01)
A47J 31/36 (2006.01)
A47J 31/06 (2006.01)
(Continued)

(52) U.S. Cl.
CPC .......... A47J 31/3695 (2013.01); A23F 5/262 (2013.01); A47J 31/0668 (2013.01); A47J 31/3623 (2013.01); A47J 31/3628 (2013.01); A47J 31/3676 (2013.01); A47J 31/407 (2013.01); B65D 85/8046 (2013.01); B65D 85/804 (2013.01)

(58) Field of Classification Search
CPC ................ A47J 31/3695; A47J 31/0668; A47J 31/3628; A47J 31/3623; A47J 31/3676; A23F 5/26; B65D 85/8046; B65D 85/804
USPC ............ 99/295, 323, 302 R, 289 R; 426/433
See application file for complete search history.

(56) References Cited

U.S. PATENT DOCUMENTS

| 1,090,900 | A | 3/1914 | Barrett |
| 2,778,739 | A | 1/1957 | Rodth |
| 2,899,886 | A | 8/1959 | Rodth |

(Continued)

FOREIGN PATENT DOCUMENTS

| CH | 605293 | 9/1978 |
| DE | 60200994 | 8/2005 |

(Continued)

OTHER PUBLICATIONS

International Patent Application No. PCT/IB2009/050564 (Mariller et al.) filed Feb. 11, 2009.

(Continued)

Primary Examiner — Reginald L Alexander
(74) Attorney, Agent, or Firm — Nixon & Vanderhye P.C.

(57) ABSTRACT

Devices for preparing a drink extracted from a capsule include a capsule mounting and a capsule housing, inside of which at least one water inlet and a capsule-boring means are arranged, wherein the housing is sized so as to at least partially deform any capsule, consisting of a material that is deformable when placed in contact with hot water and placed in the housing, such that the capsule is retained in the housing after the contact thereof with the hot water.

29 Claims, 5 Drawing Sheets

(51) Int. Cl.
*A23F 5/26* (2006.01)
*A47J 31/40* (2006.01)

(56) References Cited

U.S. PATENT DOCUMENTS

| | | | |
|---|---|---|---|
| 3,094,892 | A | 6/1963 | Topf |
| 3,199,398 | A | 8/1965 | Weisz |
| 3,236,145 | A | 2/1966 | Schenkel |
| 3,323,404 | A | 6/1967 | Fischer |
| 4,136,202 | A | 1/1979 | Favre |
| 4,846,052 | A | 7/1989 | Favre |
| 6,026,732 | A | 2/2000 | Kollep et al. |
| 6,499,388 | B2 | 12/2002 | Schmed |
| 6,655,260 | B2 * | 12/2003 | Lazaris ............ A47J 31/0668 99/295 |
| 7,028,604 | B2 | 4/2006 | Cortese |
| 7,946,217 | B2 | 5/2011 | Favre et al. |
| 8,047,126 | B2 | 11/2011 | Doglioni Majer |
| 8,336,447 | B2 | 12/2012 | Jarisch et al. |
| 8,720,320 | B1 * | 5/2014 | Rivera ............ A47J 31/0678 99/295 |
| 2003/0056661 | A1 | 3/2003 | Hu et al. |
| 2003/0217644 | A1 | 11/2003 | Jarisch et al. |
| 2009/0130270 | A1 | 5/2009 | Cortese |
| 2012/0031279 | A1 | 2/2012 | Mariller et al. |
| 2012/0276255 | A1 | 11/2012 | Verbeek |
| 2013/0174744 | A1 | 7/2013 | Etter |

FOREIGN PATENT DOCUMENTS

| | | |
|---|---|---|
| DE | 102006016421 | 12/2007 |
| EP | 0242556 | 10/1987 |
| EP | 0 710 462 | 4/1998 |
| EP | 0891734 | 1/1999 |
| EP | 1101430 | 5/2001 |
| EP | 1 203 554 A1 | 5/2002 |
| EP | 1 295 554 | 3/2003 |
| EP | 1 500 357 | 1/2005 |
| EP | 1 859 712 A1 | 11/2007 |
| EP | 2374383 | 10/2011 |
| FR | 1240813 | 8/1960 |
| FR | 1300817 | 7/1962 |
| FR | 1562417 | 4/1969 |
| GB | 1182227 | 2/1970 |
| JP | 3-58231 | 6/1991 |
| WO | WO 02/00073 A1 | 1/2002 |
| WO | WO 2007/122208 A1 | 11/2007 |
| WO | 2008/037642 | 4/2008 |
| WO | WO 2009/090201 | 7/2009 |
| WO | WO 2009/090201 A1 | 7/2009 |
| WO | WO 2009/115474 A1 | 9/2009 |
| WO | WO 2010/092543 A2 | 8/2010 |

OTHER PUBLICATIONS

"Harpon" Wikipedia Article—WayBack Machine, 2007 (2 pages) (retrieved from http://wayback.archive.org/web/20070422062956/http://fr.wikipedia.org/wiki/Harpon Apr. 29, 2014).

J.Y.H. Fuh, et al., "Computer-Aided Injection Mold Design and Manufacture", Marcel Dekker, Inc., 2004 (23 pages).

Tool and Manufacturing Engineers Handbook, vol. 8, Plastic Part Manufacturing, Society of Manufacturing Engineers (SME), Ed. Philip Mitchell, 1996 (30 pages).

Klein, Peter, "Fundamentals of Plastics Thermoforming", Synthesis Lectures on Materials Engineering, Morgan & Claypool Publishers, 2009 (12 pages, including pp. 45-49).

Amazon.com product and publication information for "Fundamentals of Plastics Thermoforming" (Synthesis Lectures on Materials Engineering) by Peter Klein, published May 12, 2009 (3 pages) (retrieved from http://www.amazon.com/Fundamentals-Thermoforming-Synthesis-Materials-Engineering/dp/1598298844 Apr. 11, 2014).

Michel Chatain and Alexandre Dobraczynski, "Injection des thermoplastiques: les moules", Ref. No. A3680a, in Techniques de l'Ingénieur, Plastiques et composites, Jan. 1997 (8 pages).

Michel Chatain and Alexandre Dobraczynski, "Injection des thermoplastiques: les moules", Ref. No. A3682, in Techniques de l'Ingénieur, Plastiques et composites, Jan. 1997 (14 pages).

"Undercuts" from Arrem Plastics: Design Guide—WayBack Machine 2009 (2 pages) (retrieved from http://web.archive.org/web/20090712162104/http://marketingtech.com/designguide/dgundercuts.htm, Apr. 29, 2014).

Assignation Devant Le Tribunal de Grande Instance de Paris re Ethical Coffee Company SA and Nespresso France et al., Apr. 8, 2011 (18 pages).

Vegeplast fabriquera les dosettes de café concurrentes de Nespresso retrieved Apr. 15, 2014 from http://www.objectifnews.com/node/1430 (2 pages).

Form—Opposition à un brevet européen re European Patent No. EP 2312978 entitled "Dispositif Pour La Preparation D'Une Boisson Extraite a Partir D'Une Capsule" by Nestec S.A. And Nespresso France dated Aug. 1, 2013 (6 pages).

Opposition Brief of Nestec S.A. and Nespresso France re EP 2312978 B1, dated Aug. 1, 2013 (25 pages).

Opposition Brief of Nestec S.A. and Nespresso France re EP 2312978 B1, dated Apr. 30, 2014 (50 pages).

Japanese Office Action dated May 13, 2014 issued in Japanese Patent Application No. 2012-521136 and English translation, 6 pp.

International Search Report for PCT/IB2010/053256, dated Nov. 5, 2010.

Written Opinion of the International Searching Authority for PCT/IB2010/053256, dated Nov. 5, 2010.

English Translation of International Preliminary Report on Patentability (IPRP) for PCT/IB2010/053256, dated Jul. 16, 2010.

Nestec S.A. et al, Grounds for Appeal, Opposition Proceedings Against EP2312978, Jul. 25, 2016.

* cited by examiner

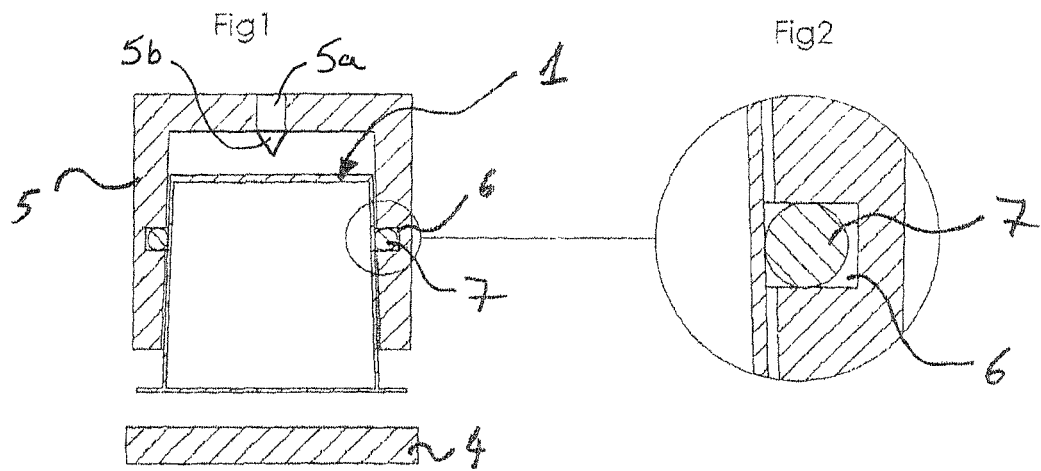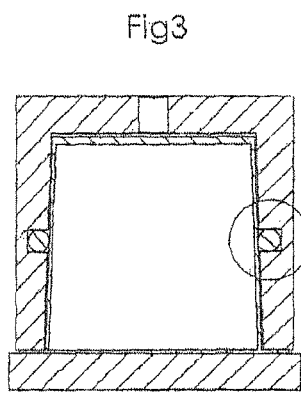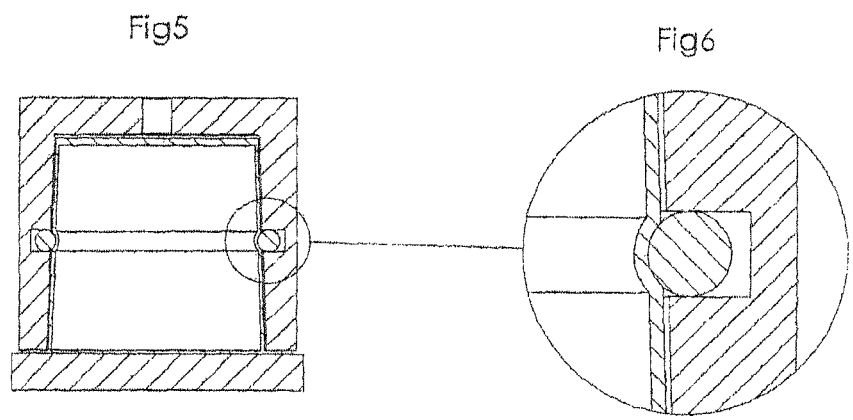

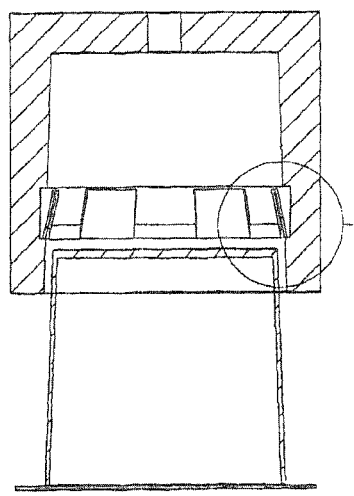
Fig7
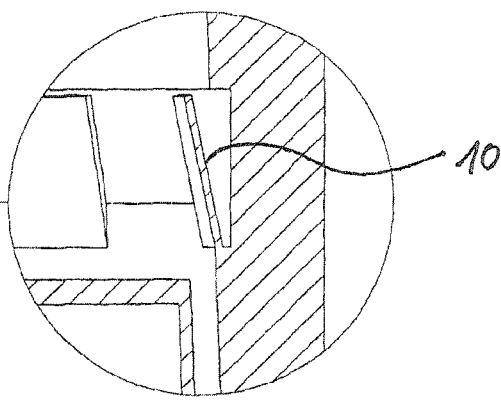
Fig8
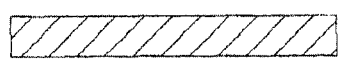
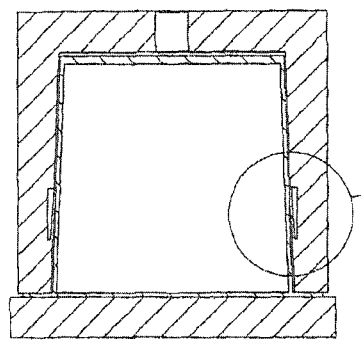
Fig9
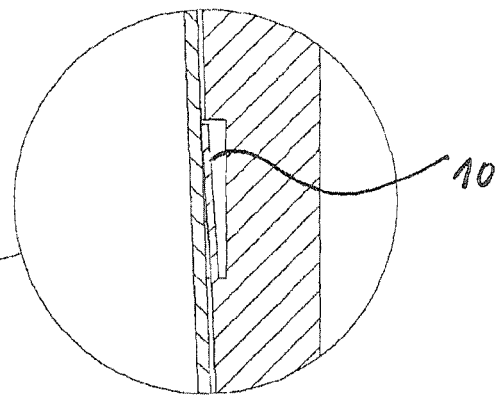
Fig10
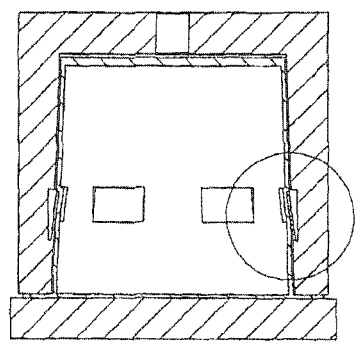
Fig11
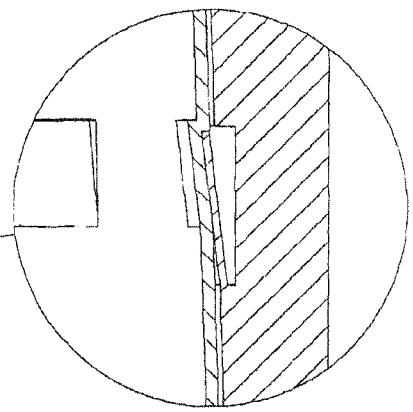
Fig12

DEVICE FOR PREPARING A DRINK EXTRACTED FROM A CAPSULE

CROSS-REFERENCE TO RELATED APPLICATIONS

This application is a continuation of copending U.S. application Ser. No. 13/386,482 filed on 6 Apr. 2012 (now U.S. Pat. No. 9,113,746), which in turn is the U.S. national phase of International Application No. PCT/IB2010/053256 filed 16 Jul. 2010, which designated the U.S. and claims priority to IB Application No. PCT/IB2009/053205 filed 23 Jul. 2009, the entire contents of each such prior filed application being expressly incorporated hereinto by reference.

FIELD

The present invention falls within the field of the preparation of drinks or beverages, e.g. those based on coffee, by extracting a concentrated dose, e.g. of ground coffee, contained in a capsule. It relates more specifically to the devices that use such capsules.

BACKGROUND AND SUMMARY

Capsules and machines that operate on the aforementioned principle have been in existence for several decades.

Patents U.S. Pat. No. 2,899,886, U.S. Pat. No. 2,968,560, U.S. Pat. No. 3,403,617 and U.S. Pat. No. 3,607,297 describe devices in which the capsule is initially pierced at several points, then has pressurized water passed through it.

The capsule described in patent CH 605 293 or in patent EP 0 242 556 B1 comprises a membrane in its lower part. Water under pressure is initially introduced into the upper part of the capsule, causing the capsule to swell, mainly in the region of the membrane. Beyond a certain pressure, the membrane tears thereby allowing a water-coffeee mixture to flow out.

Other capsules equipped with membranes are described in the following patent documents: EP 0 468 079 A, EP 0 806 373 A, EP 0 554 469 A.

The present invention seeks to avoid the use of capsules made of a material that can be deformed on contact with hot water. This is because that type of material can cause malfunctioning in certain devices.

The subject of the invention is therefore a device for preparing a drink extracted from a capsule comprising a capsule support and a capsule cage inside which there are at least a water inlet and capsule-piercing means, characterized in that said cage is sized in such a way as to deform, at least partially, any capsule, made of a material that can be deformed upon contact with hot water, which is placed in the cage, so that the capsule is retained in the cage following its contact with hot water.

According to a first embodiment of the invention, the internal wall of the cage comprises a recess in which is housed a deformable element the coefficient of rigidity of which is greater than the coefficient of rigidity of the material of which the capsule is made.

The recess may have the form of an annular groove or of one or several holes.

According to another embodiment of the invention, the internal wall of the cage comprises pivoting elements of the vane type which are designed to be completely housed in the wall of the cage if the coefficient of rigidity of the capsule exceeds a set value and, if not, to emerge at least partially from said wall.

According to another embodiment of the invention, the internal wall of the cage comprises a relief of the barbed hook type.

Finally, the internal wall of the cage may be in the form of a bell and has an internal volume greater than the volume of the capsules.

BRIEF DESCRIPTION OF THE DRAWINGS

The invention is described in greater detail hereinafter via some nonlimiting embodiments illustrated by the following figures:

FIGS. 1 to 6 show one example of a device which embodies the invention;

FIGS. 7-12 show another example of a device which embodies the invention;

DETAILED DESCRIPTION

Figure 13:
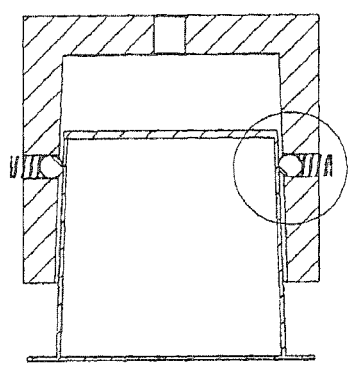
FIGS. 13-18 show another example of a device which embodies the invention.

FIGS. 1 to 6 show one example of a device according to the invention in which the internal wall of the cage comprises a recess 6 in the form of an annular groove, the inside of the recess 6 being occupied by a slightly deformable element 7, e.g. an O-ring or a spring which, by allowing itself to be compressed a little, allows a rigid capsule to be inserted into the cage 5, without the capsule 1 becoming deformed. If the capsule 1 softens as a result of its coming into contact with hot water (see FIGS. 5 and 6), the side wall of the capsule 1 is deformed in the region of the recess 6. Once the hot water has been removed, the capsule 1 stiffens and remains jammed in the cage 5, thereby rendering the device inoperative. It should be noted that the slightly deformable element 7 has to be adapted so that it applies a certain force toward the center of the cage 5. The cage 5 is also provided with a water inlet 5a and a piercing device 5b.

Figure 14:
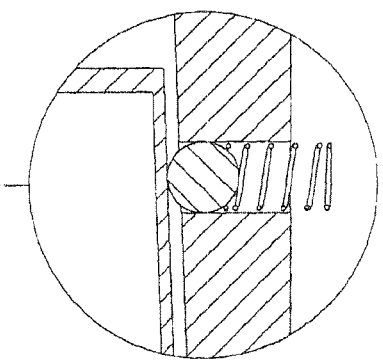
Figure 15:
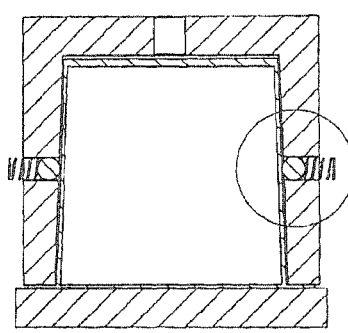
Figure 16:
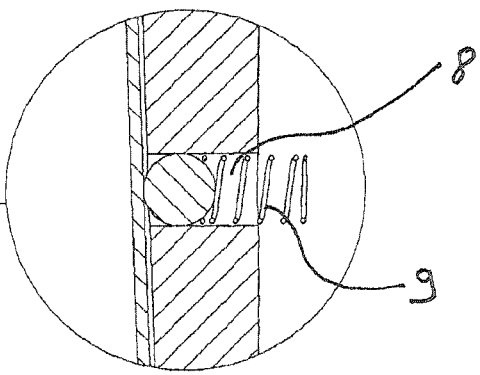
Figure 17:
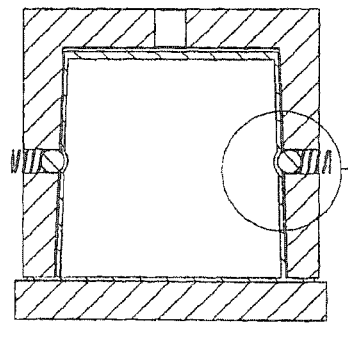
Figure 18:
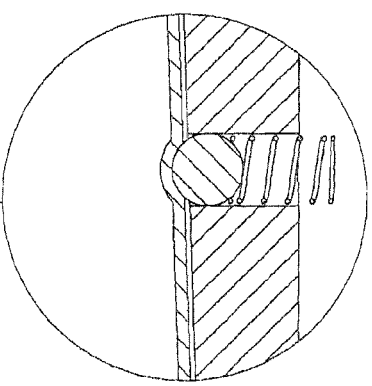

The alternative form illustrated in FIGS. 13 to 18 works in a similar way to the one illustrated in FIGS. 1 to 6. It differs only in that the recess is in the form of at least one cylindrical hole 8 in which a spring 9 is placed. For preference, use is made of several holes 8 distributed around the capsule 1.

The alternative form shown in FIGS. 7 to 12 also has a cage 5 with one or more recesses. However, in this case, the deforming element has the form of a vane 10 that pivots about a horizontal axis. When the capsule 1 is inserted into the cage, the vane 10 is completely housed in its recess. Once the capsule 1 is softened, each vane 10 digs into the wall of the capsule 1. The geometry of the vanes 10 has the effect of acting like a barbed hook. As can be seen in FIGS. 11 and 12, the capsule 1 is retained in the cage 5.

Figure 19:
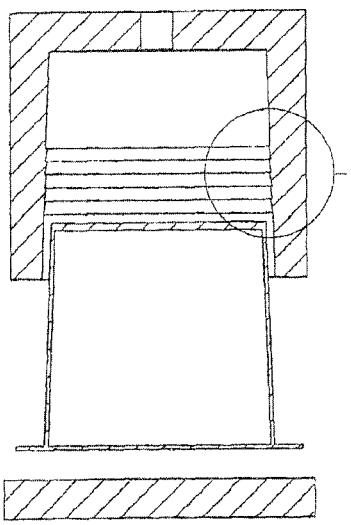
FIGS. 19-24 show another example of a device which embodies the invention.
Figure 20:
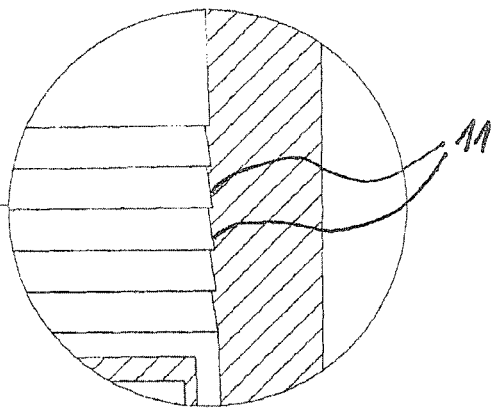
Figure 21:
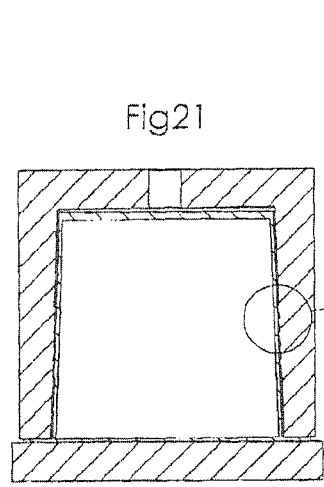
Figure 22:
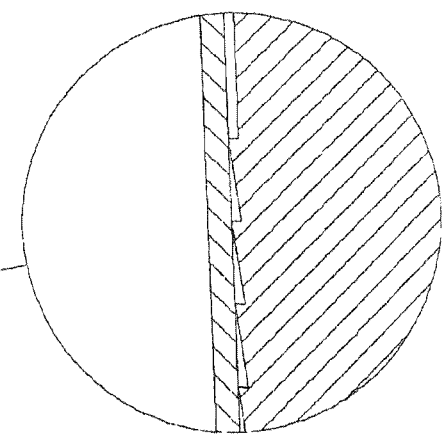
Figure 23:
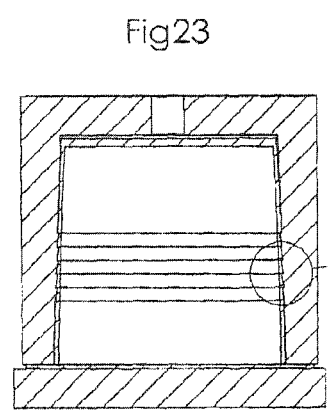
Figure 24:
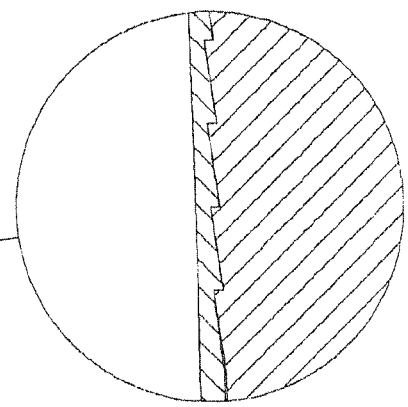

The alternative form in FIGS. 19 to 24 is characterized by an internal cage 5 wall which comprises a toothed relief in the form of a barbed hook 7. When the capsule 1 softens, part of its material becomes lodged between the teeth of the cage 5, thereby retaining the capsule 1 in the cage 5.

Figure 25:
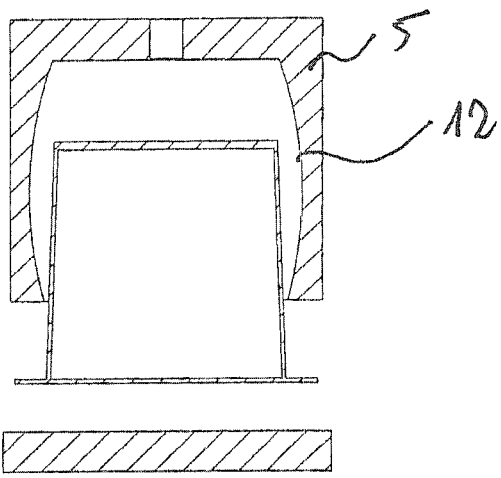
FIGS. 25-28 show another example of a device which embodies the invention.
Figure 26:
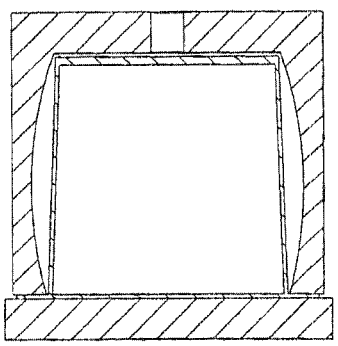
Figure 27:
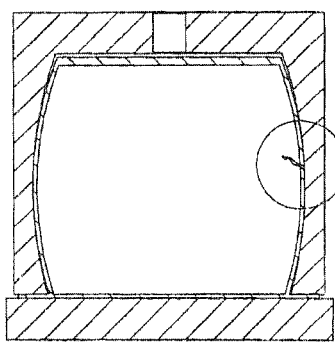
Figure 28:
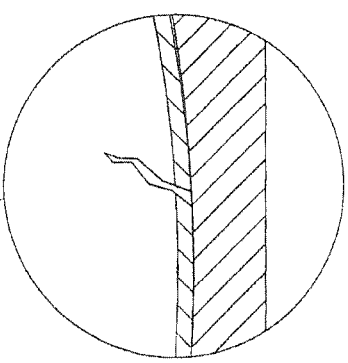

Finally, the alternative form in FIGS. 25 to 28 shows a cage 5 in the form of a bell the internal volume of which is greater than that of the capsules. When hot water enters a capsule that can be deformed upon contact therewith, the deformation is such that its side wall may burst (see FIGS. 27 and 28). The capsule cannot therefore be used. Further, once the hot water has been removed, the capsule 1 is jammed in the cage 5.

It goes without saying that the invention is not restricted to the examples illustrated in the figures.

The invention claimed is:

1. A device for preparing a drink extracted from a capsule comprising:
   a capsule support,
   a capsule cage, and
   at least a water inlet and capsule-piercing device inside the capsule cage, wherein
   the capsule cage is sized in such a way as to at least partially deform any capsule made of a material that can be deformed upon contact with hot water which is placed in the capsule cage so that the capsule is retained in the capsule cage following its contact with hot water, and wherein the capsule cage includes an internal wall which comprises at least one recess, and
   at least one deformable element housed in the at least one recess, the at least one deformable element being compressed therein by the capsule so as to responsively cause the at least one deformable element to deform the capsule.

2. The device as claimed in claim 1, wherein the at least one deformable element has a coefficient of rigidity greater than a coefficient of rigidity of the material from which the capsule is made.

3. The device as claimed in claim 2, wherein the recess is an annular groove.

4. The device as claimed in claim 2, wherein the recess is a hole.

5. The device as claimed in claim 4, comprising several recesses in the form of holes.

6. The device as claimed in claim 1, wherein the cage includes an internal wall which comprises pivoting elements, wherein the pivoting elements are completely housed in the internal wall of the cage if a coefficient of rigidity of the capsule exceeds a set value, but emerge at least partially from the wall if the coefficient of rigidity of the capsule is less than the set value.

7. The device as claimed in claim 1, wherein the capsule cage includes an internal wall which comprises a barbed hook relief.

8. The device as claimed in claim 1, wherein the capsule cage includes a bell-shaped internal wall having an internal volume greater than a volume of the capsules.

9. The device according to claim 1, wherein the at least one deformable element is a sprint.

10. The device according to claim 1, wherein the at least one deformable element is an O-ring.

11. A method of preparing a drink from a capsule comprising:
    (a) placing a capsule formed of a material that is deformable upon contact with hot water into the capsule cage of a device according to claim 1;
    (b) bringing hot water into contact with the capsule to cause the capsule to at least partially deform within the capsule cage;
    (c) retaining the at least partially deformed capsule within the capsule cage after contact with the hot water.

12. The method according to claim 11, wherein step (c) is practiced by allowing the at least partially deformed capsule to be in contact with deformable elements housed in a recess of an internal wall of the capsule cage.

13. The method according to claim 12, which further comprises providing the deformable elements with a coefficient of rigidity which is greater than a coefficient of rigidity of the material from which the capsule is made, wherein step (c) includes allowing the material from which the capsule is made to soften upon contact with the hot water and deform in a region of the recess, the material stiffening upon removal of the hot water so as to be jammed in the capsule cage, thereby rendering the device inoperative.

14. The method according to claim 11, which further comprises providing pivoting elements within an internal wall of the capsule cage, wherein step (c) comprises housing the pivoting elements in the internal wall of the capsule cage if a coefficient of rigidity of the capsule exceeds a set value, and allowing the pivoting elements to emerge at least partially from the internal wall of the capsule cage if the coefficient of rigidity of the capsule is less than the set value.

15. The method according to claim 14, wherein step (c) includes softening the capsule material in a region of the pivoting elements by contact with hot water to allow the coefficient of rigidity of the capsule to become less than the set value and allowing the pivoting elements to emerge at least partly from the internal wall of the capsule cage and dig into the softened wall of the capsule thereby retaining the capsule therein.

16. The method according to claim 11, wherein step (c) is practiced by providing an internal wall of the capsule cage with a barbed hook relief, and softening the capsule material in a region of the barbed hook relief by contact with hot water so that at least part of the capsule material becomes lodged between teeth of the barbed hook relief thereby retaining the capsule in the capsule cage.

17. The method according to claim 11, wherein step (c) is practiced by providing the capsule cage with a bell-shaped internal wall having a volume greater than a volume of the capsule, and allowing the capsule to at least partially deform and expand upon contact with the hot water such that the capsule is retained in the capsule cage upon removal of contact with the hot water.

18. A device for preparing a drink extracted from a capsule containing a drink substance to be extracted by hot water therefrom and being formed of a material which softens and deforms in response to contact with the hot water during drink extraction, wherein the device comprises a capsule cage for receiving the capsule;
    a capsule support for supporting the capsule within the capsule cage,
    a water inlet to introduce hot water into the capsule cage,
    a capsule-piercing device located inside the capsule cage for piercing the capsule to allow hot water introduced into the capsule cage to contact the drink substance within the capsule, and
    a capsule-retaining device in operative association with the capsule cage, the capsule retaining device being in retaining engagement with the capsule only in response to the capsule being softened and at least partially deformed upon contact with the hot water thereby retaining the capsule in the capsule cage once contact between the capsule and the hot water has been removed, wherein
    the capsule-retaining device comprises a recess formed in an internal wall of the capsule cage, and a deformable element positioned within the recess, wherein in response to the at least one deformable element being compressed by the capsule, the at least one deformable element is caused to deform the capsule.

19. The device as claimed in claim 18, wherein the deformable element has a coefficient of rigidity is greater than a coefficient of rigidity of the material forming the capsule when softened in response to contact with hot water.

20. The device as claimed in claim 19, wherein the recess is an annular groove formed in the wall of the capsule cage.

21. The device as claimed in claim 19, wherein recess comprises a hole, and wherein the deformable element is positioned in the hole.

22. The device as claimed in claim 21, comprising several holes each having a deformable element positioned therein.

23. The device according to claim 18, wherein the at least one deformable element is a sprint.

24. The device according to claim 18, wherein the at least one deformable element is an O-ring.

25. A device for preparing a drink extracted from a capsule containing a drink substance to be extracted by hot water therefrom and being formed of a material which softens and deforms in response to contact with the hot water during drink extraction, wherein the device comprises:
    a capsule cage for receiving the capsule;
    a capsule support for supporting the capsule within the capsule cage;
    a water inlet to introduce hot water into the capsule cate;
    a capsule-piercing device located inside the capsule cate for piercing the capsule to allow hot water introduced into the capsule cage to contact the drink substance with in the capsule; and
    a capsule-retaining device in operative association with the capsule cage, the capsule-retaining device being in retaining engagement with the capsule only in response to the capsule being softened and at least partially deformed upon contact with the hot water thereby retaining the capsule in the capsule cage once contact between the capsule and the hot water has been removed, wherein
    the capsule-retaining device comprises pivoting elements formed on an internal wall of the capsule cage, wherein the pivoting elements are completely housed in the internal wall of the cage if the capsule exhibits a coefficient of rigidity which exceeds a set value and emerge at least partially from the internal wall of the capsule cage when the coefficient of rigidity of the capsule is less than the set value in response to being softened by contact with hot water.

26. The device according to claim 25, wherein the at least one deformable element is a sprint.

27. The device according to claim 25, wherein the at least one deformable element is an O-ring.

28. A device for preparing a drink extracted from a capsule containing a drink substance to be extracted by hot water therefrom and being formed of a material which softens and deforms in response to contact with the hot water during drink extraction, wherein the device comprises:
    a capsule cage for receiving the capsule;
    a capsule support for supporting the capsule within the capsule cage;
    a water inlet to introduce hot water into the capsule cate;
    a capsule-piercing device located inside the capsule cate for piercing the capsule to allow hot water introduced into the capsule cage to contact the drink substance with in the capsule; and
    a capsule-retaining device in operative association with the capsule cage, the capsule-retaining device being in retaining engagement with the capsule only in response to the capsule being softened and at least partially deformed upon contact with the hot water thereby retaining the capsule in the capsule cage once contact between the capsule and the hot water has been removed, wherein
    the capsule-retaining device comprises a barbed hook relief formed on an internal wall of the capsule cage.

29. A device for preparing a drink extracted from a capsule containing a drink substance to be extracted by hot water therefrom and being formed of a material which softens and deforms in response to contact with the hot water during drink extraction, wherein the device comprises:
    a capsule cage for receiving the capsule;
    a capsule support for supporting the capsule within the capsule cage;
    a water inlet to introduce hot water into the capsule cate;
    a capsule-piercing device located inside the capsule cate for piercing the capsule to allow hot water introduced into the capsule cage to contact the drink substance with in the capsule; and
    a capsule-retaining device in operative association with the capsule cage, the capsule-retaining device being in retaining engagement with the capsule only in response to the capsule being softened and at least partially deformed upon contact with the hot water thereby retaining the capsule in the capsule cage once contact between the capsule and the hot water has been removed, wherein
    the capsule-retaining device comprises a bell-shaped internal wall of the capsule cage having an internal volume greater than a volume of the capsule in the capsule cage prior to contact with hot water.

\* \* \* \* \*